United States Patent
Barkovitz

[15] 3,699,748
[45] Oct. 24, 1972

[54] WET SCRUBBER DUST COLLECTOR

[72] Inventor: William E. Barkovitz, Lincoln Park, Mich.

[73] Assignee: American Radiator & Standard Sanitary Corporation, New York, N.Y.

[22] Filed: Oct. 24, 1969

[21] Appl. No.: 869,066

[52] U.S. Cl. .................. 55/223, 55/227, 55/233, 55/241, 55/257, 261/95, 261/96, 261/98, 261/109, 261/111, 261/112
[51] Int. Cl. ..................... B01d 45/06, B01d 45/10
[58] Field of Search ........ 55/223, 227, 228, 229, 233, 55/241, 257; 261/94–98, 108–112

[56] References Cited

UNITED STATES PATENTS

| 1,460,490 | 7/1923 | Johnston | 261/111 X |
| 3,502,596 | 3/1970 | Sowands | 261/94 X |
| 3,505,788 | 4/1970 | Teller et al. | 55/257 X |
| 2,702,699 | 2/1955 | Kinney | 261/108 X |
| 1,176,747 | 3/1916 | Ferguson | 261/111 X |
| 1,986,736 | 1/1935 | Mauthe et al. | 261/111 |
| 2,054,315 | 9/1936 | Ebner et al. | 261/111 X |
| 1,823,269 | 9/1931 | Grill | 261/112 X |

Primary Examiner—Tim R. Miles
Assistant Examiner—Steven H. Markowitz
Attorney—John E. McRae, Tennes I. Erstad and Robert G. Crooks

[57] ABSTRACT

A wet dust collector or scrubber having an inertial separator section for removing a substantial percentage of the dust particles from the treated gas stream, a porous packing subjected to flushing liquid for producing a concentrated fog and assimilating the remaining dust particles into said fog, and a second separator section for removing the wet dust particles from the gas stream. The first inertial section preferably comprises spaced baffles which are subjected to liquid spray for collection of dust particles and for prevention of clog-up of the baffle spaces.

8 Claims, 9 Drawing Figures

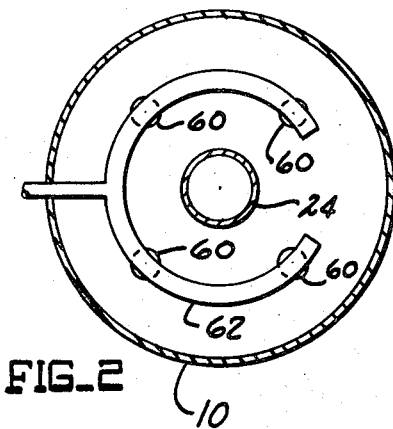
FIG. 2
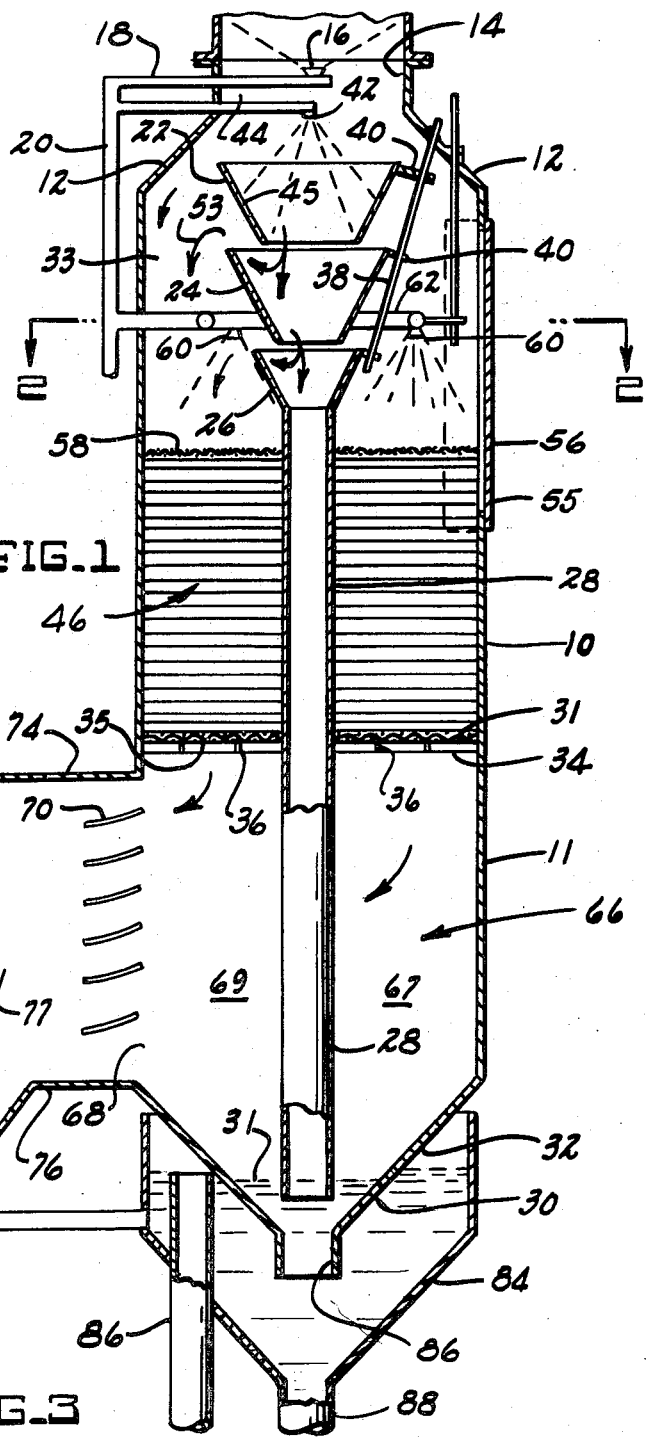
FIG. 1
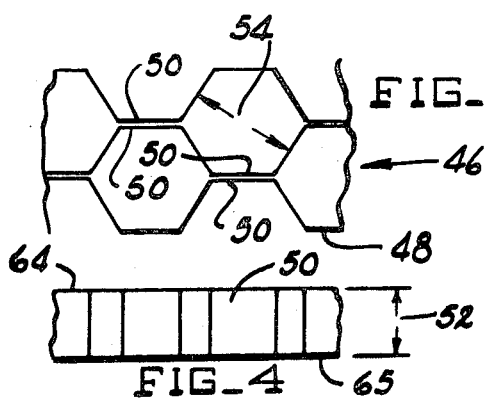
FIG. 3
FIG. 4
INVENTOR.
WILLIAM E. BARKOVITZ

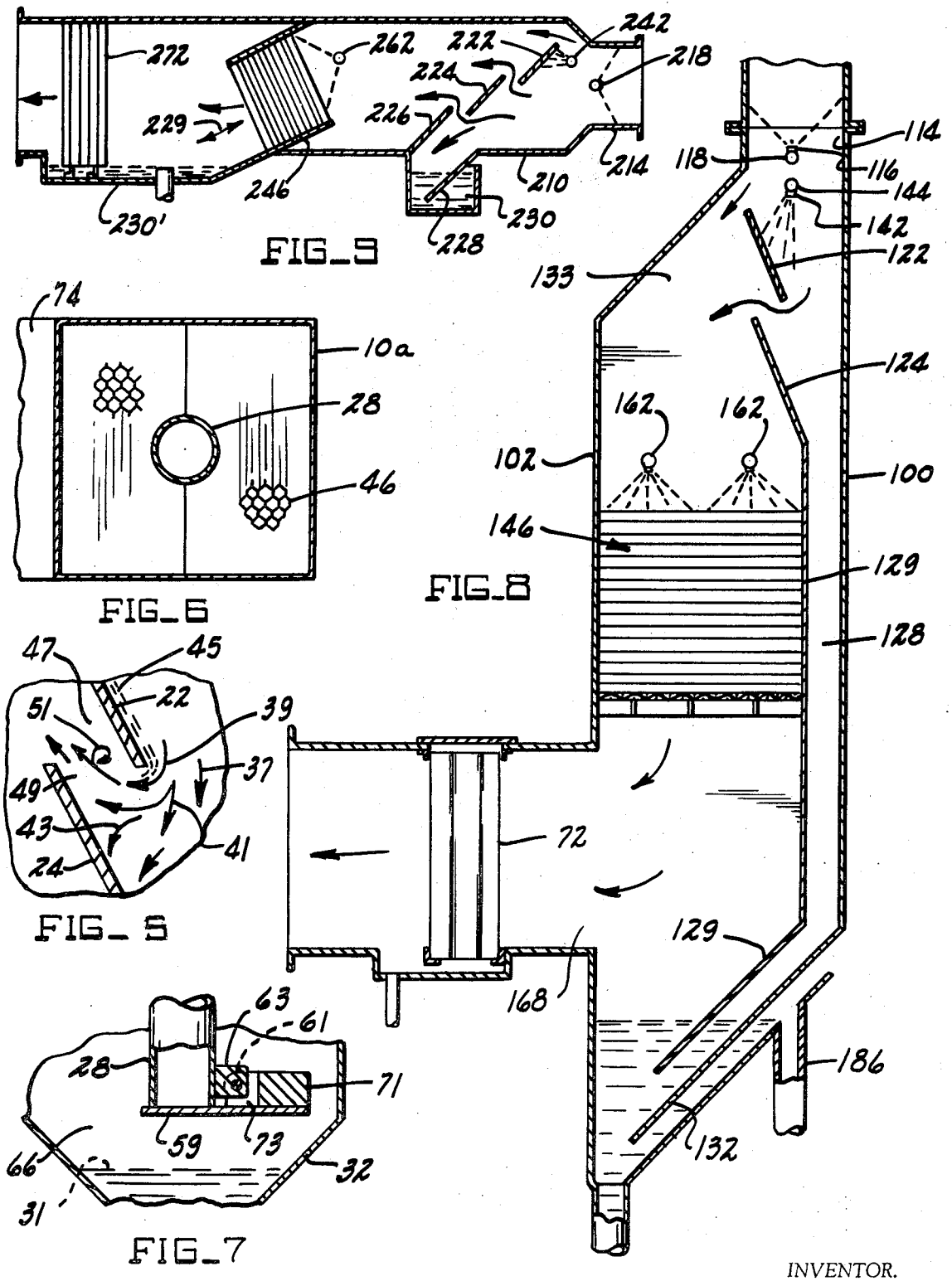

WET SCRUBBER DUST COLLECTOR

THE DRAWINGS

FIG. 1 is a sectional view taken through an upright cylindrical dust collector built according to the invention.

FIG. 2 is a sectional view taken on line 2—2 in FIG. 1.

FIG. 3 is an enlarged plan view of a porous packing employed in the FIG. 1 embodiment.

FIG. 4 is a side elevational view of the FIG. 3 packing.

FIG. 5 is an enlarged sectional view of a structural detail used in the FIG. 1 device.

FIG. 6 is a horizontal sectional view taken through another structure of the invention.

FIG. 7 shows a detail which can be used in the FIG. 1 arrangement.

FIG. 8 is a sectional view taken through an upright rectangular dust collector built according to the invention.

FIG. 9 is a sectional view taken through a rectangular horizontal flow dust collector built according to the invention.

FIG. 1 GENERAL ARRANGEMENT

FIG. 1 shows an upright casing having an inlet in its upper end for receiving the downflowing dusty gas stream either by blow-through or draw-through action. As the gas flows downwardly through the inlet it is conditioned by liquid from a spray nozzle 16; the liquid controls temperature and increases the mass of the entrained dust particles. Subsequently the wet gas traverses a first inertial separator section defined by three (or more) frusto-conical baffles 22, 24 and 26 flushed with liquid from nozzle 42. The majority of the dust particles are driven by inertial action into the frusto-conical elements and thence through a vertical tube 28 to a dust receiver constructed as a liquid sump 32. The gas and lighter dust particles reverse directions twice and flow down around the outside of the frusto-conical elements, as at 33. The combination of various actions, including baffle deflections, agglomeration by the water sprays, flushing of the wet surfaces, multiple venturi effects, and the tortuous gas flow, removes most of the dust from the gas stream.

Partially cleaned gas escaping to space 33 flows downwardly through a packing 46 which is subjected to flushing liquid sprays from overhead nozzles 60. The liquid and gas flow together down through the cellular packing. During this downflow travel the packing surfaces producing multiple shearing actions on the liquid droplets, atomizing and breaking them into tinier droplets akin to fog. The impaction of the dust and fog coats and/or saturates the finer dust particles so that by the time the stream flows out through the lower face 35 of the packing the dust particles have a substantially greater mass than when they first entered the packing. The packing surfaces exert frictional forces on the heavier liquid-dirt agglomerates so that these agglomerates are moving at a slower velocity than the air particles when the composite stream exits from the packing.

An outlet opening 68 is arranged at right angles to the flow direction taken by the stream coming out of the packing. Consequently the stream is forced to make an abrupt directional change as it seeks the outlet opening. During this directional change many of the still entrained wetted dust particles are driven into the sump 30 by inertial action. Some of the wetted dust particles remote from outlet opening 68 may deposit in the sump by gravity action.

It will be seen that the general arrangement involves a wetting of the gas stream by nozzle 16, a first inertial separation of the heavier wetted dust particles by the frusto-conical baffles, the production of a fine water mist or fog within the packing 46, and a second separation of the finer dust particles as the gas flow toward outlet opening 68.

FIG. 1 STRUCTURE

FIG. 1 shows a dust collector comprising an upright cylindrical casing 10 having a conical neck section 12 which terminates in a cylindrical inlet opening 14 for a downflowing stream of gas having dust particles entrained therein. Arranged within inlet 14 is a spray nozzle 16 suitably connected to a water supply pipe 18 extending from a main water pipe 20. Nozzle 16 preferably delivers a wide conical stream of water into the inlet so that substantially all of the downflowing gas is required to pass through the sprayed liquid. As the dust contacts the liquid the entrained dust particles are coated with or enveloped in liquid particles, thereby effectively increasing the mass of each particle in the gas stream.

Arranged below inlet 14 are three (or more) frusto-conical baffles or funnels 22, 24, and 26. These funnels are preferably spaced one above another so that gas flowing downwardly into the funnels can pass laterally and outwardly through the three annular spaces between the funnels and conical wall 12.

The lowermost funnel 26 is connected to a cylindrical duct or tube 28 which is effectively closed at its lower end by its being emersed in a body of liquid 30 contained within a conical sump 32. The sump liquid prevents any appreciable flow of gas downwardly through tube 28; however separated dust particles and water can gravitate downwardly through tube 28 and into the sump liquid.

Tube 28 and its funnel 26 may be suitably suspended within the cylindrical casing 10 by a framework 34 which consists of radial or chord-like bars extending inwardly from the casing 10 to welded connections with the tube; suitable transverse bars 36 interconnect the support bars to form a grid which bears the weight of a screen or fence 31. An annular packing 46 rests on screen 31.

The three funnels 22, 24 and 26 may be suitably supported one above the other in fixed or adjustable positions by means of three or more rods which extend through slots in ears or tabs 40 welded to the respective funnels; only one rod (designated 38) is visible in FIG. 1. To provide satisfactory collector efficiency, preclude excessive pressure drops, and/or bypassing of one or more of the funnels it may be necessary in some cases to adjust or vary the funnel spacing. Such adjustment can be achieved by using rods 38 which are threaded along their lengths, and clamping the funnels at selected elevations via clamping nuts against the upper and lower faces of the respective ears 40.

OPERATION OF THE CONES (FIGS. 1 AND 5)

The gas, which has been wetted by the nozzle 16, flows downwardly toward funnel 22 and undergoes certain directional changes. Some of the gas flows between the upper edge of funnel 22 and the frusto-conical wall 12; some of the gas flows downwardly through the funnel 22 and thence laterally through the annular space between funnels 22 and 24; some of the gas flows downwardly through funnel 24 and thence laterally through the annular space between funnels 24 and 26. Each of the individual gas streams undergoes a lateral and outward radial movement, which includes venturi and reversal actions as it transverses the funnels. The wetted relatively heavy dust particles in the individual streams have inertial forces thereon which cause them to continue their downward motions as denoted by arrow 39 in FIG. 5. Dust-water agglomerates tend to separate out of the stream by inertia action, and to flow downwardly as denoted by numeral 41. Some of the dust-water agglomerates still remaining in the stream are not able to make a complete reversal; such agglomerates will impact against funnel 24 as denoted by numeral 43.

As seen from FIG. 1, the spray from nozzle 42 contacts funnel 22 well above its lower edge. This liquid tends to follow down the inner surface of the funnel as denoted by numeral 45 in FIG. 5. The arrow 39 stream entrains much of this liquid as the liquid leaves the lower edge of the funnel. The action is such as to produce considerable turbulence; such turbulence promotes assimilation of the dust particles into the arrow 39 stream.

The fluid stream is not able to completely fill the annular space between the lower edge of funnel 22 and the upper edge of funnel 24. The fluid tends to fill zone 49 adjacent the edge of funnel 24 and to leave a void zone 47 near the surface of funnel 22. Concentration of the stream in zone 49 produces increased fluid velocities in that zone. The very minimal velocities in zone 47 coupled with the high velocities in zone 49 produce a differential velocity in the adjacent boundary layers which causes vortical turbulence, as denoted by arrow 51. Such vortices are useful in mixing water and air droplets together to provide heavy agglomerates. Localized turbulence provides impaction between the dust and water droplets which breaks the surface tension and promotes assimilation of the dust into the droplets.

Some of the arrow 45 water manages to flow or be thrown downwardly against the inner surface of funnel 24. Such water is able to flush particles which have impacted the funnel at 43. Ultimately some of the downflowing stream reaches the tube 28.

It will be seen from FIG. 1 that the fast-moving stream issuing from zone 49 (FIG. 5) has an upward component in the general direction of conical wall surface 12. The gas particles undergo a second directional change as denoted by numeral 53. Some of the heavier dust-water agglomerates continue on toward the casing wall 12 and impinge against wall 12 or against cylindrical wall 10. The fluid stream flowing downwardly from the space between funnel 22 and wall 12 tends to flush these separated agglomerates down the wall 10 surface into packing 46.

POROUS PACKING 46

The partially cleaned gas passing into space 33 is caused to flow downwardly through a porous packing 46 which is preferably comprised of a multiplicity of layers of honeycomb or egg crate material. As shown in FIG. 4, each layer may be formed of sinuous strips of material 48 arranged so that face areas 50 on adjacent strips are facially engaged and adhered to one another. The individual strips 48 are preferably thin gauge material, as for example 0.004 to 0.010 inches thick. Suitable materials are sheet aluminum, water proof paper, plastic such as polyvinyl chloride, or resin-impregnated asbestos.

Preferably the strips 48 have a vertical dimension 52 less than one-half inch, as for example one-fourth inch. The lateral or diametrical dimension of each cell is preferably on the order of three-eighths to one-half inch as denoted by dimension 54 in FIG. 3. The packing 46 is formed by stacking the individual cellular structures on one another at random to build up multiple layers, as for example 100 layers; each layer provides multiple shearing edges facing the oncoming gas-dust water stream. Assuming a vertical dimension 52 of one-fourth inch, and a packing composed of 100 layers, the total packing depth would be 25 inches.

The packing preferably fills the entire annular space between tube 28 and casing 10. The packing therefore can be split on the diameter of the casing into two pie shaped sections. Loading of the packing may be accomplished through an opening 55 which is closed by an access panel 56 when the collector is in service; an annular screen 58 may be laid onto the upper layer of packing to prevent fluid lift action.

Packing 46 may be flushed with liquid by means of four or more spray nozzles 60 depending from a water manifold pipe 62. The aim is to provide a mass of liquid evenly across the upper face of the packing so that each of the cells is supplied with a down flowing mass of liquid. The cells in successive ones of the packing layers preferably are offset from one another so that liquid flowing from each cell is caused to strike the thin upper edge 64 (see FIG. 4) of the strip 48 in the next lowermost layer. The upper or leading edges of the various strips 48 produce a shearing action on the downflowing water droplets, thereby breaking or atomizing the larger droplets into extremely fine droplets something akin to a fog. The fine dust particles in the gas stream are coated or agglomerated into this fog to thus increase their mass.

Assuming a casing 10 diameter of about 3 feet and a cell width of three-eighths inch, each packing layer would present perhaps 30,000 cutting edges 64 to the oncoming fluid stream. A total packing depth of 100 layers would then mean a total number of cutting edges 64 approximating 3,000,000. Lower edges 65 might also perform some droplet cutting during turbulent motions of the droplets.

The cell openings in packing 46 preferably have a fairly small hydraulic radius for attainment of as many shearing edges 64 as possible. Small cell opening sizes would normally present clogging difficulties. However, with the illustrated collector the majority of the dust particles are removed by the aforementioned baffle elements, so that only fine dust particles reach the packing 46. Therefore clogging should not be a problem.

It is believed that the gas particles will have a higher linear velocity than the dust or water while the stream is flowing through the packing; this is because the gas is able to proceed through the packing pores with lessened inertia and deflection than the water or dust. Velocity differentials between the gas and the solid or liquid particles will produce some turbulent vortices which will further promote solid-liquid mixing. It is also believed that the solid-liquid particles will be slowed by frictional interaction with the side surface areas of the cell walls 48.

The general action of the cellular packing is believed to be an agglomeration of the dust particles and water particles, and a deceleration of the agglomerates relative to the gas particles.

THIRD SEPARATOR STAGE

As the stream containing the agglomerated dust flows into the space 66 below the packing 46 it is forced to turn 90° and move through a gas outlet opening 68 in the side wall of cylinder 10. The change in direction of the gas stream causes the relatively heavy wetted dust particles to be deposited in the sump by inertial separator action.

Preferably the packing 46 does not retain any of the dust particles; its function is to finely atomize the liquid droplets, to assimilate the fine dust particles into the atomized fog atmosphere which is developed, and to provide wetted surface for collection and disposal of droplets. Removal of dust particles is accomplished by the directional changed of the gas as it moves toward outlet opening 68. The agglomerates in zone 67 (to the right of tube 28) are believed to more readily separate out of the gas stream than the agglomerates in zone 69 (to the left of tube 28). This is because the gas moving through zone 69 has a tendency to carry some of the droplets through opening 68. Such re-entrained droplets are separated from the stream in an eliminator section 72.

DROPLET ELIMINATION

Substantially clean gas flows through opening 68 and across the straightener vanes 70 into a droplet eliminator section 72. Outlet opening 68 is a rectangular opening defined by rectangular duct having a top wall 74, a bottom wall 76, and two parallel vertical side walls 77. The air straightener vanes 70 extend the full width between the two vertical side walls, and are preferably provided with apertures to permit drainage of liquid therethrough.

Eliminator 72 may comprise a series of upright thin metal plates having sinuous contours formed by vertical bends 78. The plates may be suspended from their upper edges or otherwise supported to provide predetermined spacings between adjacent plates, such that the gas and any entrained droplets take sinuous paths through the eliminator section. Droplets collect in the vertical pockets formed by the bends 78 and eventually run down into a drain pan 80. A removable plate or cover 82 may be provided in the top wall of the duct to permit installation and replacement of the plates.

SUMP OPERATION

During operation of the collector liquid and dust particles are continuously deposited in the sump liquid. To maintain a suitable sump liquid level and to provide an air seal, the sump is preferably equipped with a surrounding trap chamber 84 having an overflow stand pipe 86. The stand pipe maintains a suitable level in chamber 84 such that collected dirt particles can gravitate downwardly through the sump opening 86 toward the discharging pipe 88 in the trap chamber. Periodically or in response to sediment accumulation a valve in the discharge line 88 may be opened to remove sediment accumulations from chamber 84. With large dust concentrations this action may take place fairly frequently or on a continuous basis, should continued flushing of the trap chamber prove necessary.

FIG. 6

FIG. 6 shows a slight variation from the FIG. 1 structure, the difference being that in FIG. 6 the casing 10a has a square or rectangular cross section, as opposed to the circular cross section of FIG. 1. The general mode of operation of FIG. 6 is similar to that of FIG. 1.

FIG. 7

FIG. 7 illustrates a structural detail that can be used in FIG. 1. It involves a shortening of tube 28 so that its lower end is located above the liquid level 31 in sump 32. A closure plate 59 may be pivotally mounted on a hinge pin 61 which goes through an ear 63 suitably welded to tube 28. A weight 71 is carried on the upper face of plate 59 between the plate flange 73.

In operation, the flow resistance offered by tube 28 is somewhat less than that offered by packing 46. Therefore, if tube 28 were fully open at its lower end an excessive percentage of the gas would flow down through tube 28. The closure plate 59 prevents sucy excessive gas flow without completely closing the tube opening. Weight 71 is preferably chosen to substantially balance gas pressure drop between the tube interior and zone 66. Therefore a liquid head build-up in the tube opens closure 59 to permit exhaustion of dust and droplet accumulations. Plate 59 exerts a baci-pressure on the tube fluid without interference with gravity discharge of the the droplets from the tube into the sump.

FIG. 8

FIG. 8 shows a vertical dust collector having essentially the same theory of operation as the FIG. 1 collector. The FIG. 8 collector, instead of being cylindrical, is rectangular in horizontal cross section. It comprises a casing having a flat vertical back wall 100, a flat vertical front wall 102, and two vertical side walls. The inlet opening 114 is rectangular and preferably extends the full width of the collector housing, measured normal to the plane of the paper. The entering gas stream is subjected to water spray by means of a straight transverse water pipe 118 having spray nozzles 116 at spaced points therealong.

Two flat baffles 122 and 124 extend the full width of the collector casing, thus providing two slot-like spaces along the upper and lower edges of baffle 122 for passage of the gas into the area 133 above the packing 146. The dust separated out of the stream by the baffles 122 and 124 is caused to gravitate downwardly through a dead end duct 128 formed by casing wall 100 and a false flat wall or partition 129. Wall 129 preferably extends the full width of the casing. As in the FIG. 1 collector baffles 122 and 124 are preferably kept clean by streams of flushing water, in this case by means of nozzles 142 connected at spaced points along water supply pipe 144.

The packing 146 preferably comprises layers of cellular material similar to that shown in FIGS. 3 and 4, said material being rectangular in plan cross section so as to occupy the entire space between walls 102 and 129. One or more spray water pipes 162 may be provided above the packing to supply flushing liquid. The operation of the sump section and the eliminator section is similar to that of FIG. 1.

FIG. 9

FIG. 9 illustrates a dust collector wherein the treated gas flows horizontally. The collector comprises a rectangular casing 210 having a rectangular inlet 214 equipped with a transverse spray pipe 218 generally similar to pipe 118 of FIG. 8. Wetted gas flows across flat transverse baffles 222, 224, and 226, thus causing the coarse dust particles to be directed into a vertical dust tube or duct 228 which terminates in a liquid sump 230. A transverse water spray pipe 242 keeps the baffles clean in the manner of pipe 142 in the FIG. 8 arrangement.

The partially cleaned gas passes through a porous packing 246 which may be similar to the packing shown in FIGS. 3 and 4. The packing layers are however angularly oriented so that the cell passages are on inclined axes 229. The cells provide a multiplicity of declining passages, thus allowing the gas, water and fine dust particles to flow generally downwardly and leftwardly through the packing. Water supply pipe 262 floods the passages with liquid to provide the aforementioned fog for agglomerating and increasing the mass of the fine particles.

Separation of the agglomerated particles out of the gas stream is completed by inertial and inpact action in the eliminator section 272. Thus, the gas is required to change its direction as it moves through the eliminator, thereby allowing the dust particles and water particles to be deposited in the sump 230'; the sump may be provided with a trap chamber similar to that shown in the FIG. 1 collector.

I claim:

1. A dust collector comprising a gas flow casing having an inlet for receiving dusty gas and an outlet for exhausting clean gas; a porous packing arranged between the inlet and outlet to intercept the flowing gas; means applying flush liquid to the packing, whereby said liquid is intermixed with the flowing stream and subjected to shearing action by the packing surface, thus producing a fog which mixes with the dust particles then in the stream; a final separator arranged between the packing and clean gas outlet to remove fog-coated particles from the stream after said stream has passed through the packing; and a preliminary separator arranged between the gas inlet and porous packing; said preliminary separator comprising overlapped closely spaced baffles having frontal faces thereof exposed to the oncoming gas stream and having rear faces thereof exposed to the entering face of the porous packing; said baffles being elevated above a dust receiver that communicates with the baffle frontal faces, whereby dust particles enjoy a gravitational path from said frontal faces into the receiver; said baffles being angled to the oncoming stream and being arranged in parallel flow relation tone another, whereby the oncoming stream is separated into multiple component gas streams that are individually forced to turn in tight radii to pass from the baffles frontal faces to the baffle rear faces; the entering face of the packing communicating with each of the baffles rear faces so that the partially cleaned component streams recombine and then pass through the packing.

2. The dust collector of claim wherein the gas flow casing is downflow casing having a top inlet and a bottom outlet; the aforementioned baffles being located within the upper portion of the casing; and the packing being located below the baffles so that gas flows downwardly from the baffle spaces through the packing.

3. The dust collector of claim 1 and further comprising means for spraying flush liquid against the frontal faces of the baffles to wet the oncoming dust particles and promote gravitational movement of the particles out of the gas stream.

4. The dust collector of claim 1 wherein the gas flow casing is a downflow casing having a top inlet and a bottom outlet; the aforementioned baffles taking the form of vertically spaced funnels arranged in axial alignment with one another within the upper portion of the casing; the upper ends of the funnels being larger than the lower ends; the packing being located below the space occupied by the funnels; the casing space surrounding the funnels being in open communication with the funnel spaces and the upper face of the packing.

5. The dust collector of claim 4 and further comprising a dust drainage duct extending downwardly from the lowermost funnel through the packing.

6. The dust collector of claim 4 wherein the aforementioned means for applying flush liquid to the packing comprises downspray nozzle means arranged in the casing space surrounding the funnels.

7. The dust collector of claim 1 wherein the gas flow casing is a downflow casing having a top inlet and a bottom outlet; the aforementioned baffles being located within the upper portion of the casing; the packing being located below the baffles so that gas flows through the spaces between the baffles into a casing space above the packing, and thence downwardly through the packing toward the aforementioned final separator.

8. The dust collector of claim 1 wherein the packing consists of a multiplicity of cellular egg crate sections laid on one another in layers; successive layers being staggered in direction normal to the cell axes, whereby the frontal edges of the cell walls produce shearing action on the flush liquid; said packing being arranged for downflow movement of the gas therethrough; the means for applying fluid liquid comprising liquid nozzles located above the packing to wet the packing upper face.

* * * * *